US012803190B2

(12) United States Patent
Niestrat et al.

(10) Patent No.: US 12,803,190 B2
(45) Date of Patent: Nov. 17, 2026

(54) TERMINAL BLOCK WITH PILOT SCREWS

(71) Applicant: HORA ETEC GMBH, Bünde (DE)

(72) Inventors: Dirk Niestrat, Löhne (DE); Ralf Holtmann, Bünde (DE)

(73) Assignee: HORA eTec GmbH, Bünde (DE)

( * ) Notice: Subject to any disclaimer, the term of this patent is extended or adjusted under 35 U.S.C. 154(b) by 340 days.

(21) Appl. No.: 18/686,389

(22) PCT Filed: Oct. 21, 2022

(86) PCT No.: PCT/EP2022/079349
§ 371 (c)(1),
(2) Date: Feb. 23, 2024

(87) PCT Pub. No.: WO2023/072746
PCT Pub. Date: May 4, 2023

(65) Prior Publication Data

US 2024/0356245 A1 Oct. 24, 2024

(30) Foreign Application Priority Data

Oct. 27, 2021 (DE) ..................... 20 2021 105 883.8

(51) Int. Cl.
*H01R 4/36* (2006.01)
*H01R 43/20* (2006.01)

(52) U.S. Cl.
CPC ............... *H01R 4/36* (2013.01); *H01R 43/20* (2013.01)

(58) Field of Classification Search
CPC .................................. H01R 4/36; H01R 43/20
See application file for complete search history.

(56) References Cited

U.S. PATENT DOCUMENTS

| | | | | |
|---|---|---|---|---|
| 5,266,057 A * | 11/1993 | Angel, Jr. | ............ | H01R 4/5025 439/798 |
| 7,134,921 B2 * | 11/2006 | Siracki | ................... | H01R 4/305 439/798 |
| 8,303,350 B2 * | 11/2012 | Skowranek | .............. | H01R 9/24 439/727 |
| 2010/0107406 A1 | 5/2010 | Feye-Hohmann | | |
| 2011/0183552 A1 | 7/2011 | Skowranek | | |

FOREIGN PATENT DOCUMENTS

| | | | |
|---|---|---|---|
| DE | 202008012128 | U | 4/2009 |
| DE | 102007058040 | A | 6/2009 |
| DE | 102007058051 | B | 8/2009 |
| DE | 10 2008 046 467 | A | 3/2010 |
| DE | 202008011993 | U | 9/2010 |
| DE | 102012203554 | A | 9/2012 |
| DE | 20 2014 105 219 | U | 7/2015 |
| WO | 2009/068216 | A | 6/2009 |

OTHER PUBLICATIONS

International Search Report of Counterpart PCT International Application No. PCT/EP2022/079349.

* cited by examiner

*Primary Examiner* — Neil Abrams
(74) *Attorney, Agent, or Firm* — LIU & LIU

(57) ABSTRACT

The invention relates to a clamp (10), more particularly PEN clamp, for connection of electrical conductors, and is characterized by the use of pilot screws (28) as the clamping screws and/or in the way the pilot screws (28) are axially and/or radially secured.

11 Claims, 7 Drawing Sheets

TERMINAL BLOCK WITH PILOT SCREWS

BACKGROUND OF THE INVENTION

1. Field of the Invention

The invention relates to a terminal for the connection of electrical conductors, in particular a terminal functioning as a protective earth neutral [PEN]-terminal.

2. Description of Related Art

Such terminals are known in the art.

SUMMARY OF THE INVENTION

One purpose of the innovation presented here is to provide a terminal with inputs according to the prior art, but that can be used with particular ease and safety.

This is solved according to the invention by means of a terminal with characteristics according to claim 1.

The terminal, specifically arranged for the connection of a conductor, in particular of PEN conductors, comprises an at least two-part housing with a housing base body and a housing cover, as well as a terminal body positioned in the housing base body. Optionally, the terminal is a terminal with a housing base body, a terminal body positioned in the housing base body, and a housing cover that closes the housing base body and secures the terminal body in the housing base body. For the connection of electrical conductors, namely for the introduction of the ends of the electrical conductors, the terminal body has conductor insertion holes and, across from said conductor insertion holes, terminal screw holes for terminal screws. The special feature of the terminal is that pilot screws function as the terminal screws, and that the terminal has said pilot screws that function as terminal screws.

Pilot screws are known in the art and, like conventional screws (threaded screws) have a screw head and a threaded shaft attached to the screw head. The special feature of pilot screws is that they have a thread-free pilot section at the end of the threaded shaft. The diameter of the pilot section is smaller than the diameter of the threaded shaft. Therefore, a pilot screw has at least two different shaft sections, namely one on the screw shaft, connecting to the screw head, with a thread, and a pilot section connecting thereto with a comparatively smaller diameter.

In the prior art, the terminal screw hole in the terminal's terminal body has an inward-facing thread. Terminal screws are selected or manufactured so that the threading (outward facing thread) of the threaded shaft matches the inward facing thread of the terminal screw holes. Thus a pilot screw can be screwed into a terminal screw hole. Each terminal screw hole is open to a conductor insertion hole. By screwing a pilot screw into a terminal screw hole, the pilot section eventually reaches the area of the conductor insertion hole and, like a comparable conventional screw, is effectively for affixing a conductor end that has been inserted there.

Because the pilot section of a pilot screw has a smaller diameter than the threaded shaft of a comparable screw without a pilot section, even conductor ends with a smaller diameter can be securely clamped with a pilot screw. Geometrically, this can be explained as follows: The conductor insertion hole is circular. The free end of the pilot section is a line, namely a line on the plane of the circle. By screwing the pilot screw into the terminal screw hole, this imaginary line eventually comes into contact with this imaginary circle (the pilot section abuts against the inner surface of the conductor insertion hole). The imaginary line is then a circle chord. A circular segment remains between the circular chord and the circle. The smaller the circular segment (the surface of the circular segment), the shorter the circular chord is. The circle chord is shorter for a pilot screw (because of the tap) than for a comparable screw without a pilot section. The smaller the circular segment is, the better conductor ends can be clamped, even when they have a smaller diameter. This facilitates/improves the use or usability of conventional terminals.

Because the pilot sections of pilot screws are thread-free, they can be inserted into a terminal screw hole, and to the area of its internal threading with just a translational movement. Pilot screws can also reach into terminal screw holes using their pilot sections without the pilot screw being already screwed into the inner facing threads there. The pilot section is therefore effective for adjusting the threaded shaft of the pilot screw into alignment with the thread of the terminal screw hole, and with this kind of aligned adjustment, the pilot screw can be screwed directly into the threads of the terminal screw hole without risks such as tilting. This also facilitates/improves the use or usability of conventional terminals.

An arrangement for securing electrical connector terminals using screws is known from EP 2 215 693 A1. However, in this document normal threaded screws are used, in particular shaft screws, and therefore not pilot screws. An earth bar device is known from DE 20 2014 105 219 U. In this case as well, the screws intended for use as terminal screws are normal threaded screws and not pilot screws.

The dependent claims relate to advantageous embodiments of the terminals in question. The dependent relationships used in the claims show the further development of the subject matter from the claim in question through the characteristics of the respective dependent claim. These are not to be understood as a waiver of achievement of an independent, objective protection of the characteristic or combination of characteristics of a dependent claim. Furthermore, with regard to the interpretation of the claims and the description, it must be assumed when a characteristic is specified in more detail in a dependent claim that such a limitation is not present in the respective preceding claims or in a more general embodiment of the apparatus in question. Any reference in the description to aspects of dependent claims is therefore to be read expressly as a description of optional characteristics, even when no special reference is made.

It is advantageously stipulated that with such a terminal, in particular a terminal that has guide shafts in the housing cover that are aligned with the conductor insertion holes, each guide shaft has a means for reducing the effective diameter, at least in sections (diameter reducer; diameter reducer means). These are effective for axially securing (especially for axially securing and radially securing) a pilot screw in the guide shaft and thereby for axially securing the pilot screw in relation to the terminal body and the respective terminal screw hole. Due to this axial securing, the pilot section of a pilot screw, which is guided into the area of a terminal screw hole, remains in this area, and the adjustment of the terminal screw caused by the pilot section is ensured to be in alignment with the terminal screw hole and its inner-facing thread.

Two pairs of ribs and/or flat surfaces opposite of each other along a circumferential line of the guide shaft are possible as diameter reducers.

When producing a terminal of the type proposed here, the terminal body can be fully assembled with pilot screws and placed in the housing base body in its assembled state (an initially fully equipped terminal body). The housing base body is then closed using the housing cover and the housing cover secures the terminal body to the housing base body. The heads of the pilot screws are then located in the guide shafts formed in the housing cover. The assembly of the terminal body with pilot screws takes place by screwing their threaded shafts into the terminal screw holes at least a little bit, or even only a little bit (for example just one thread turn). The user of a terminal produced in this manner finds all conductor insertion hole open in a terminal body assembled with pilot screws. Conductor ends to be connected can be inserted directly and clamped by tightening the pilot screws. It is not necessary to unscrew the pilot screws beforehand in order to free up the conductor insertion holes. As an alternative to such a terminal body pre-assembled with pilot screws, the terminal body can also come without pilot screws positioned in the housing base body (subsequent assembly of the terminal body). The housing base body will also then be closed using the housing cover and the housing cover secures the terminal body to the housing base body. Afterwards, the pilot screws are introduced through the guide shafts formed in the housing cover, and screwed into the terminal screw holes in the terminal body at least a little bit, or even only a little bit. In this case as well, the user finds a terminal produced in this way with all conductor insertion holes open.

Both manufacturing variants provide the producer of such a terminal the advantage that the movement of all threads can be checked before delivery of each terminal (in particular they can be checked automatically using appropriate screwing tools) and the producer can ensure the proper operation of the terminal and each clamping site included in the terminal. With such a test step, when using a terminal body already assembled with pilot screws before positioning it in the housing base body, the pilot screws are fully screwed once into the terminal screw holes, and then unscrewed again, so far that there is only the little bit of contact mentioned above between the two threads, for example, where there is only contact of one thread along the circumference. The threads are tested by screwing in and unscrewing, and the test is only considered successful if the screwing in and then unscrewing are done smoothly. With a terminal body first placed in the housing base body with no pilot screws, and the housing base body closed by means of the housing cover, the pilot screws are inserted through the guide shafts and screwed completely into the threaded holes and then unscrewed again so far that there is only the little bit of contact mentioned above between the two threads, for example, where there is only contact of one thread along the circumference. In this case as well, the threads are tested by being screwed in and then unscrewed, and the test is only considered successful if the screwing in and then unscrewing are done smoothly.

The claims submitted with the application are a proposed wording notwithstanding the achievement of further protection. Since the characteristics of the dependent claims in particular can form separate and independent inventions in view of the prior art as of the priority date, the applicant reserves the right to make these characteristics or combinations of characteristics previously only disclosed in the description and/or drawings the subject of independent claims or division declarations. These can also include independent inventions that have a design that is independent of the subject matter of the claims referred to in each case.

An embodiment of the invention is explained below in more detail, with reference to the drawings. Corresponding items and elements are provided with the same reference numbers in all figures.

The embodiment is not to be understood as a limitation of the invention. Rather, within the scope of this disclosure, additions and modifications are also possible, in particular those that can, for example, be found by a person skilled in the art through combination or variation of individual characteristics in connection with those described in the general or specific descriptions, as well as characteristics or process steps included in the claims and/or the drawings, with a view of solving the problem, and leading to a new object through combinable characteristics.

DETAILED DESCRIPTION OF ILLUSTRATED EMBODIMENTS

Figure 1:
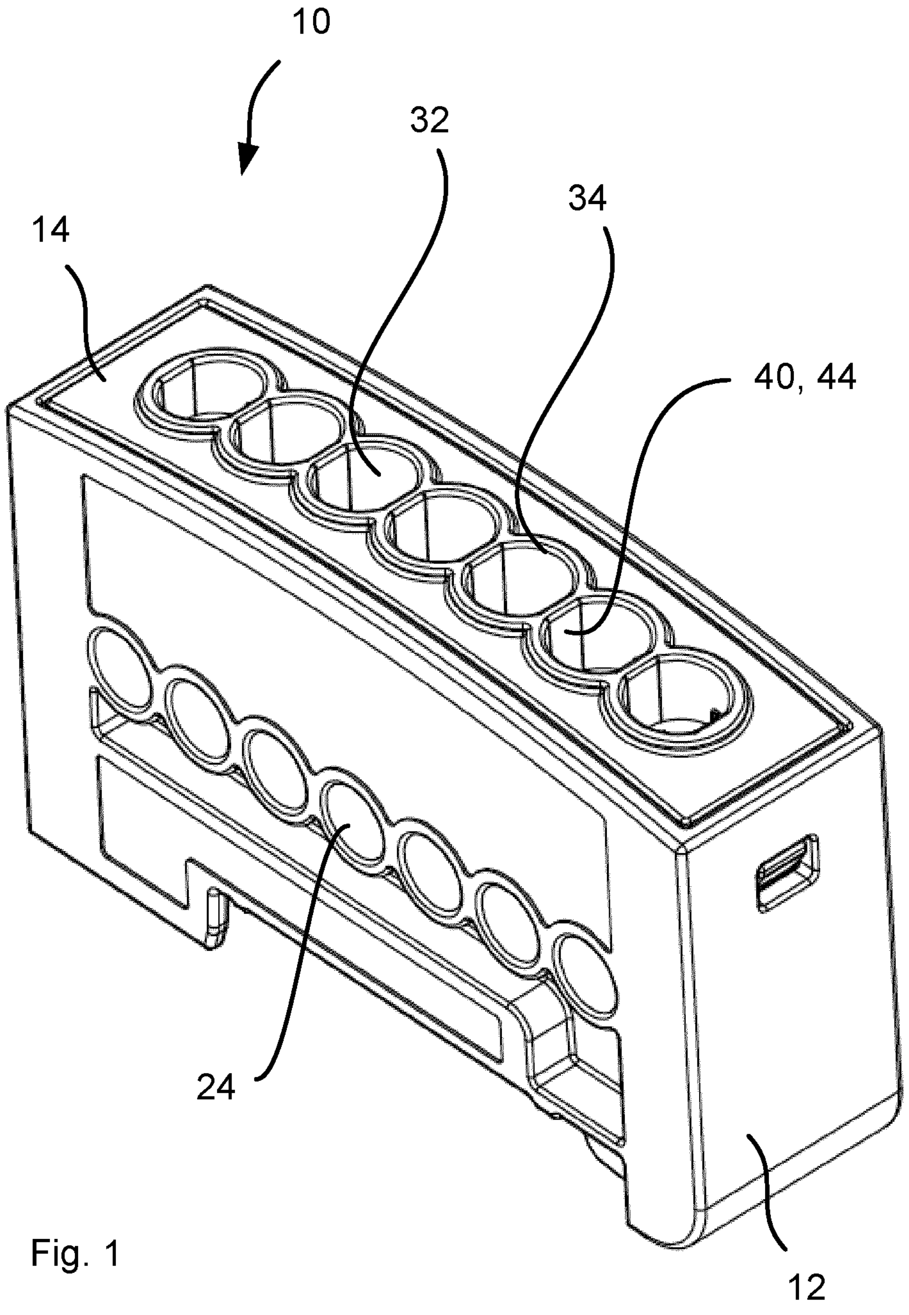
FIG. 1, FIG. 2, and FIG. 3 show different views of an embodiment of the terminal proposed here.
Figure 2:
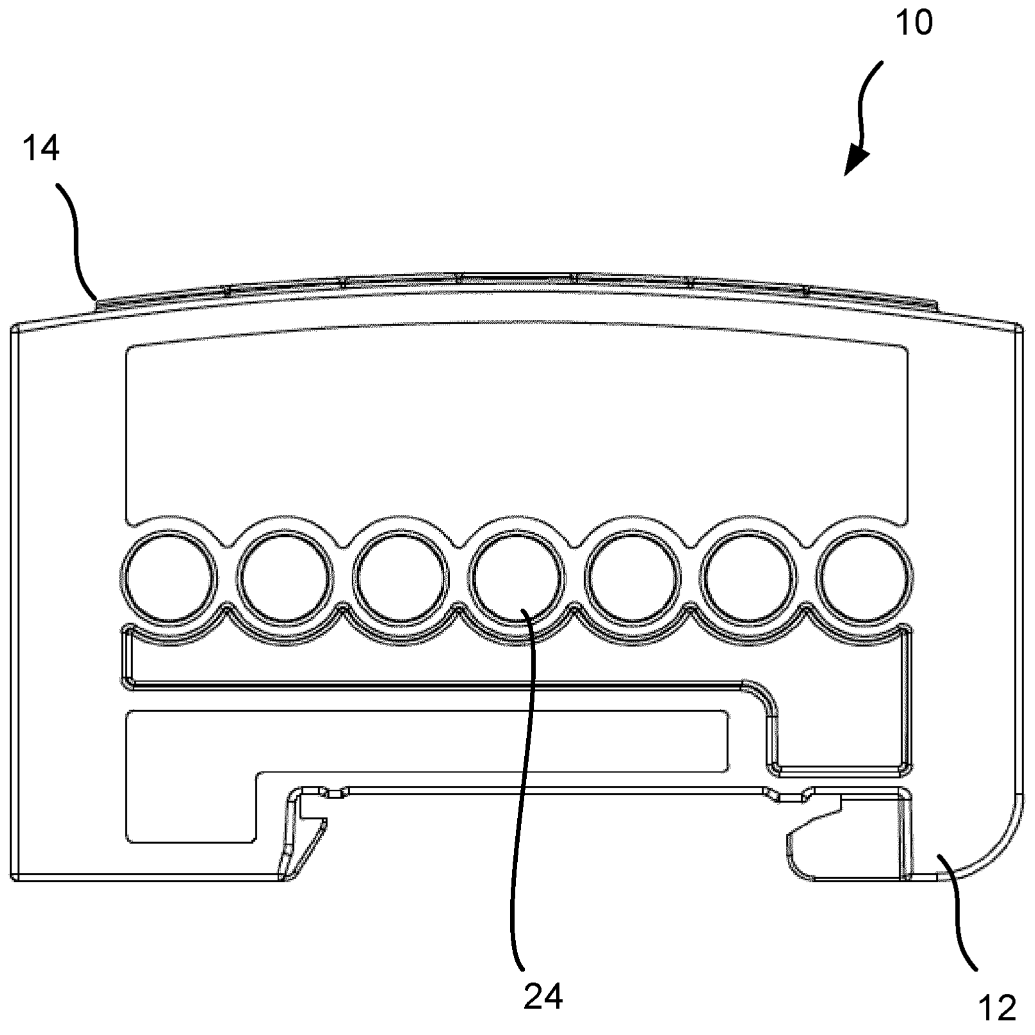
Figure 3:
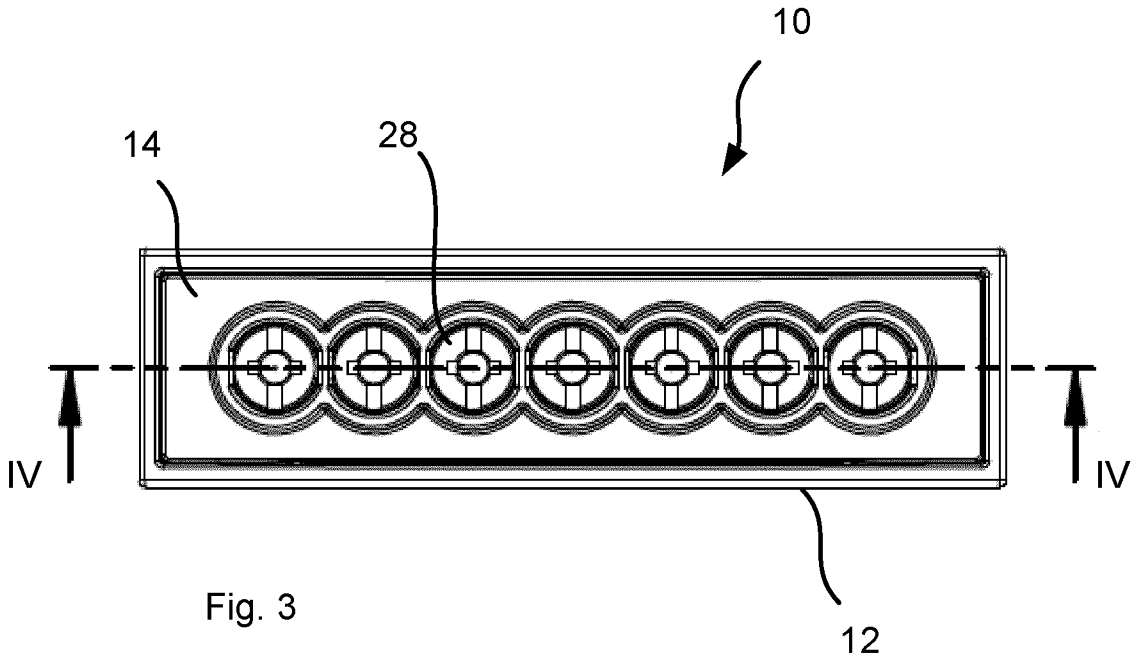

The presentations in FIGS. 1, 2 and 3 show various views of an embodiment of terminal 10 proposed here, intended in particular for use as a PEN-terminal. Terminal 10 comprises a housing of at least two parts, with a housing base body 12 and a housing cover 14. Housing base body 12 can be closed by means of housing cover 14, and when terminal 10 is in a condition such that it is ready to use, housing base body is closed by means of housing cover 14.

The illustration in FIG. 1 shows terminal 10 in an isometric view, where in the chosen perspective two side surfaces and the top side of terminal 10 can be seen. The illustration in FIG. 2 shows terminal 10 in a side view, looking at one of the large side surfaces of terminal 10. The illustration in FIG. 3 shows terminal 10 from above.

Figure 4:
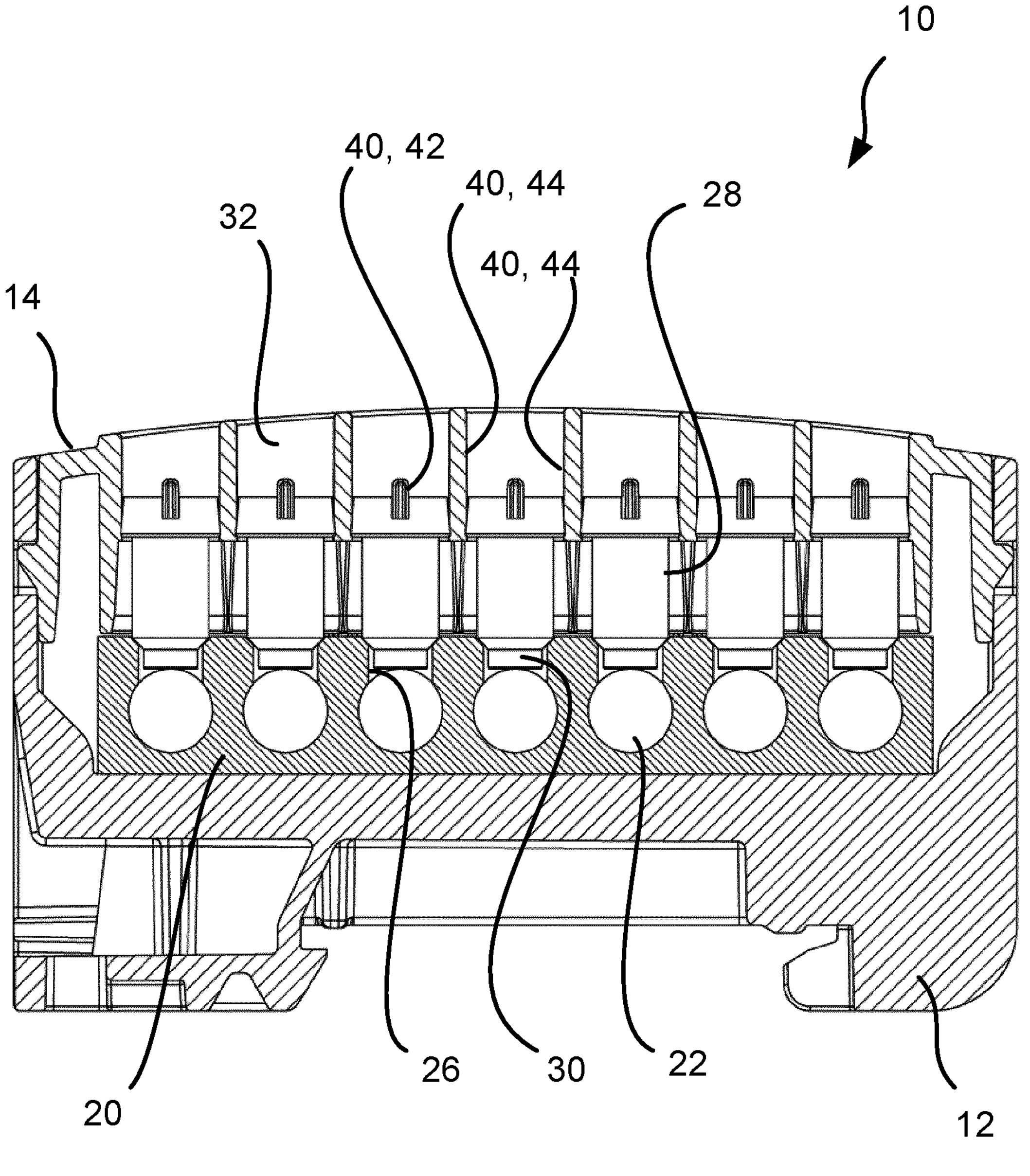
FIG. 4 shows a cross section through the terminal in FIGS. 1 through 3.

The illustration in FIG. 4 shows a cross-section through terminal 10 along the line IV-IV shown in FIG. 3.

Housing base body 12 holds terminal body 20. Housing cover 14 secures terminal body 20 in housing base body 12 when placed in housing base body 12. As an example, a brass bar, or a component made from an electrically conductive metal, functions as terminal body 20.

Terminal body 20 has, in a fundamentally known manner, a plurality of continuous (penetrating terminal body 20 transversely to its longitudinal axis), non-contacting, and non-overlapping conductor insertion holes 22. In the example shown, terminal 10 has seven such conductor insertion holes 22 for terminal body 20. The number of conductor insertion holes 22 is only provided as an example, and instead more or fewer conductor insertion holes 22 are also possible and conceivable, and as such, terminals 10 with more or fewer conductor insertion holes 22 are also considered to be included in the description presented here.

To maintain an overview of the attached Figures, only one of the conductor insertion holes 22 is shown at a time. Terminal 10 includes a plurality of characteristics, so for example, conductor insertion openings 24, terminal screw holes 26, etc., corresponding to the number of conductor insertion holes 22. To maintain an overview of the attached Figures, here as well these are only shown once in the Figures.

Housing base body 12 has a number of conductor insertion holes 22 corresponding to the number of conductor insertion openings 24, which align terminal body 20, positioned in housing base body 12, with the conductor insertion holes 22. Housing base body 12 has these conductor insertion openings 24 in both its large side surfaces (the illustrations in FIGS. 1 and 2 show the same large side surfaces and only one large side surface each).

Terminal body 12 has (likewise in a fundamentally known manner) a number of conductor insertion holes 22 corresponding to the number of terminal screw holes 26. The terminal screw holes 26 penetrate terminal body 20 (while not touching each other or overlapping each other) only one each to the conductor insertion holes 22. The axial direction of the terminal screw holes 26 is perpendicular to the axis of the conductor insertion holes 22, and likewise perpendicular to the longitudinal axis of terminal body 20. The terminal screw holes 26 extend into the material of terminal body 20 into the area of the underlying (in an axial direction) conductor insertion hole 22. The central longitudinal axis of each terminal screw hole 26 meets the respective conductor insertion hole 22 in the area of the apex of said conductor insertion hole 22; terminal screw hole 26 aligns with conductor insertion hold 22 (and correspondingly then also aligns with a guide shaft 32, respectively with a conductor insertion hole 22). Each terminal screw hole 26 has an inward-facing thread.

A terminal screw is provided in a fundamentally known manner for screwing into a terminal screw hole, using its inward-facing thread. Pilot screws 28 function as the terminal screws in the terminal presented here (FIGS. 3, 4, 7 and 8); terminal 10 proposed here has pilot screws 28 as terminal screws. Pilot screws 28 can also be seen in the illustration in FIG. 3 as part of the top view of terminal 10 shown there.

Figure 9:
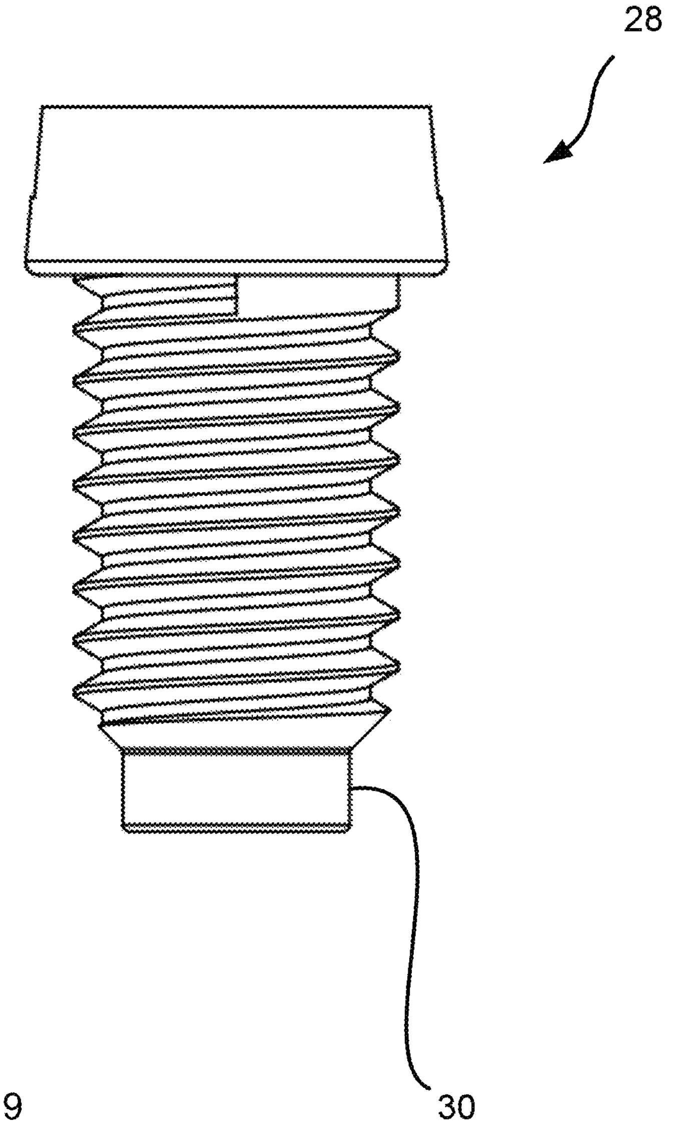
FIG. 9 is a schematic view of a pilot screw.

A pilot screw 28 comprises (like any threaded screw) a screw head (the head) with an actuating contour, and a screw shaft (the shaft) connecting thereto, with an outward-facing thread. The special feature of a pilot screw 28 is that concentrically on the shaft with the outward-facing thread there is an additional cylindrical section connected, with a diameter that is smaller in comparison to the shaft. This additional cylindrical section is the pilot section 30 (FIG. 4) of pilot screw 28. FIG. 9 is a schematic view of a pilot screw 28. FIG. 9 shows the head of the pilot screw 28 in top of the drawing. Below that is a threaded section.

Below that, in turn, is an unthreaded section, i.e. the thread-free pilot section 30 at the end of the threaded shaft.

Terminal cover 12 has (likewise in a fundamentally known manner) a number of conductor insertion holes 22 (and terminal screw holes 26) corresponding to the number of cylindrical-jacket-shaped guide shafts 32 for each pilot screw 28. These guide shafts 32 align with terminal screw holes 26, as well as with conductor insertion holes 22, and end on the top surface of housing cover 14 at each of the insertion openings 34 (see FIG. 1: the reference line runs to the edge of insertion opening 34). A central longitudinal axis of a guide shaft 32 meets perpendicularly with a central longitudinal axis of the conductor insertion hole 22 (meeting or substantially meeting and perpendicularly or at least substantially perpendicularly; both due to unavoidable manufacturing tolerances). Because of the position of these central longitudinal axes in relation to one another, it is justified, at least in an extended sense, to speak of guide shafts 32 that are concentric with conductor insertion holes 22. Insertion opening 34 allows the insertion of a tool, such as a screwdriver, for the known actuation of a single pilot screw 28.

Depending on the type of manufacturing for terminal 10 (an initially fully assembled terminal body 20 or a subsequent assembly of terminal body 20), the insertion openings 34 also allow the subsequent assemble of terminal body 20, therefore, one without pilot screws already in the terminal body 20, positioned in housing base body 12, and another with the pilot screws 28 inserted into housing base body 12 already closed with housing cover 12. Finally, insertion openings 34 and the connected guide shafts 32 also allow for possible replacement of damaged pilot screws 28 or the like.

A diameter of guide shaft 32 is based on a diameter of the head of pilot screw 28. With terminal body 20 placed in housing base body 12 and housing cover 14 attached to housing base body 12, the pilot screws 28 can be inserted through guide shafts 32 into terminal 10 and brought into contact with terminal body 20. Pilot screws 28 can also be attached to terminal body 20 (thus, partially screwed into the inner thread of the terminal screw holes 26 therein) before terminal body 20 is placed in housing base body 12, so that terminal body 20, fully assembled, is then placed in housing base body 12, and said housing base body 12 is then closed with housing cover 14, and where guide shafts 32 come over the heads of the pilot screws 28 and incorporate them.

The pilot sections 30 of pilot screws 28 bring about the desired alignment of pilot screws 28, aligning them with the terminal screw holes 26. The diameter of the pilot section 30 is smaller than the diameter of the terminal screw holes 26 (smaller than the diameter of an imaginary cylinder inscribed in the terminal screw hole 26, the lateral surface of which just touches the tips of the threads). However, the diameter of pilot section 30 is also only slightly smaller than this diameter of terminal screw hole 26, so that for example, it is at least larger than half the size of this diameter of terminal screw hole 26. For example, an M5 screw for pilot section 30 has a diameter of 2.5 mm, while the core diameter of an M5 thread hole has a diameter of 4.2 mm.

Due to its diameter, pilot section 30 can be inserted into the area of a terminal screw hole 26 with a purely translational movement, until the connecting shaft of pilot screw 28 comes into contact by its threads with the inner threads of terminal screw hole 26. As long as the threads on the shaft of pilot screw 28 are not screwed into the inward-facing threads of terminal screw hole 26, pilot section 30 can be removed from the area of terminal screw hole 26 with a purely translational movement, and pilot screw 28 can still be moved in an axial direction. Said purely translational movement is a translational movement along the longitudinal axis of pilot screw 28, along the central longitudinal axis of the respective guide shaft 32, or long the central longitudinal axis of terminal screw hole 26.

If pilot section 30 of a pilot screw 28 is in the area of a terminal screw hole 26 and the thread on the shaft of pilot screw 28 has still not been screwed into the inner threads of terminal screw hole 26, the end of pilot screw 28, located in the area of terminal screw hole 26, can still be moved in terminal screw hole 26, in particular it can be moved radially to the longitudinal axis of pilot screw 28. However, this mobility is limited by the diameter of terminal screw hole 26. Mobility is only available until pilot section 30 abuts the inner surface of terminal screw hole 26.

Due to this limitation of mobility, a pilot screw secured at the same time in the axial direction and aligned with terminal screw hole 26, cannot leave the area of said terminal screw hole 26. Pilot screw 28 can therefore be screwed into terminal screw hole 26, in particular into its inner threads, at any time. This is independent of the orientation of terminal 10, when actuating pilot screw 28. Due to pilot section 30 being located in the area of terminal screw hole 26, the positioning of pilot screw 28, which is necessary and sufficient for direct contact of both threads (the threads on the pilot screw 28; the threads in terminal screw hole 26), remains in alignment with terminal screw hole 26, even when, for example, pilot screws 28 are oriented horizontally, due to a corresponding installation of terminal 10 (where the longitudinal axes of pilot screws 28 are horizontal or at least substantially horizontal).

For the illustration in FIG. 4, the pilot screws 28 are oriented vertically (the longitudinal axes of the pilot screws 28 are vertical) and pilot screws 28 are located with their externally threaded shaft above terminal screw holes 26. This position over terminal screw holes 26 is a position in alignment with said terminal screw holes 26. However, such a position of the pilot screws 28 over terminal screw holes 26 is not always the case. With an installment of terminal 10 (e.g. in a switch cabinet or the like) in another orientation and with a corresponding different orientation of the pilot screws 28, said screws will be located next to or even under the terminal screw holes 26. Since pilot section 30 is at the end of pilot screw 28, even with this kind of installation condition, where pilot section 30 is located in the area of terminal screw hole 26, this ensures an alignment where pilot screw 28 is sufficiently aligned with terminal screw hole 26. A sufficient alignment is an alignment were the threads of pilot screw 28 can be screwed directly into the inward-facing thread of terminal screw hole 26.

In other words, the adjustment of pilot screws 28 made in terminal 10 as proposed here can be expressed as follows: The central longitudinal axes of each terminal screw hole 26, and the respective guide shafts 32, are at least in parallel, and normally coincide or at least substantially coincide. For a pilot screw 28, whose pilot section 30 is inserted into a terminal screw hole 26, this will ensure that even the longitudinal axis of this pilot screw 28 will be in parallel or at least substantially parallel with the central longitudinal axis of terminal screw hole 26, so that pilot screw 28 can be directly screwed into the threads of terminal screw hole 26.

Pilot screw 28 must also be secured in the axial direction, so that pilot section 30 of pilot screw 28 remains in the area of the respective terminal screw hole 26 when pilot screw 28 is aligned with said terminal screw hole 26. This is achieved in the terminal 10 proposed herein by means of an appropriate design of the guide shafts 32. For this purpose, guide shafts 32 have a means for the axial securing of pilot screw 28, or are designed as a means for the axial securing of pilot screw 28.

In the embodiment shown, guide shafts 32 have a means for diameter reduction (diameter reducer 40, diameter reducing means 40) as a means for axially securing a pilot screw 28. For example, two ribs 42, opposite each other along the circumferential line of a guide shaft 32, function as a diameter reducer 40 (FIGS. 4, 5, 6 and 7) and/or two flat surfaces 44 (FIGS. 1, 5, 6 and 7) opposite each another along the circumferential line of guide shafts 32 in the surface of said guide shafts 32. Ribs 42 and/or flat surfaces 44 extend in an axial direction from a respective guide shaft 32. Imaginary lines between the ribs 42 on the one hand and the flat surfaces 44 on the other hand (the line between the flat surfaces 44 is perpendicular to said flat surfaces 44) are perpendicular to each other, or substantially perpendicular.

Figure 5:
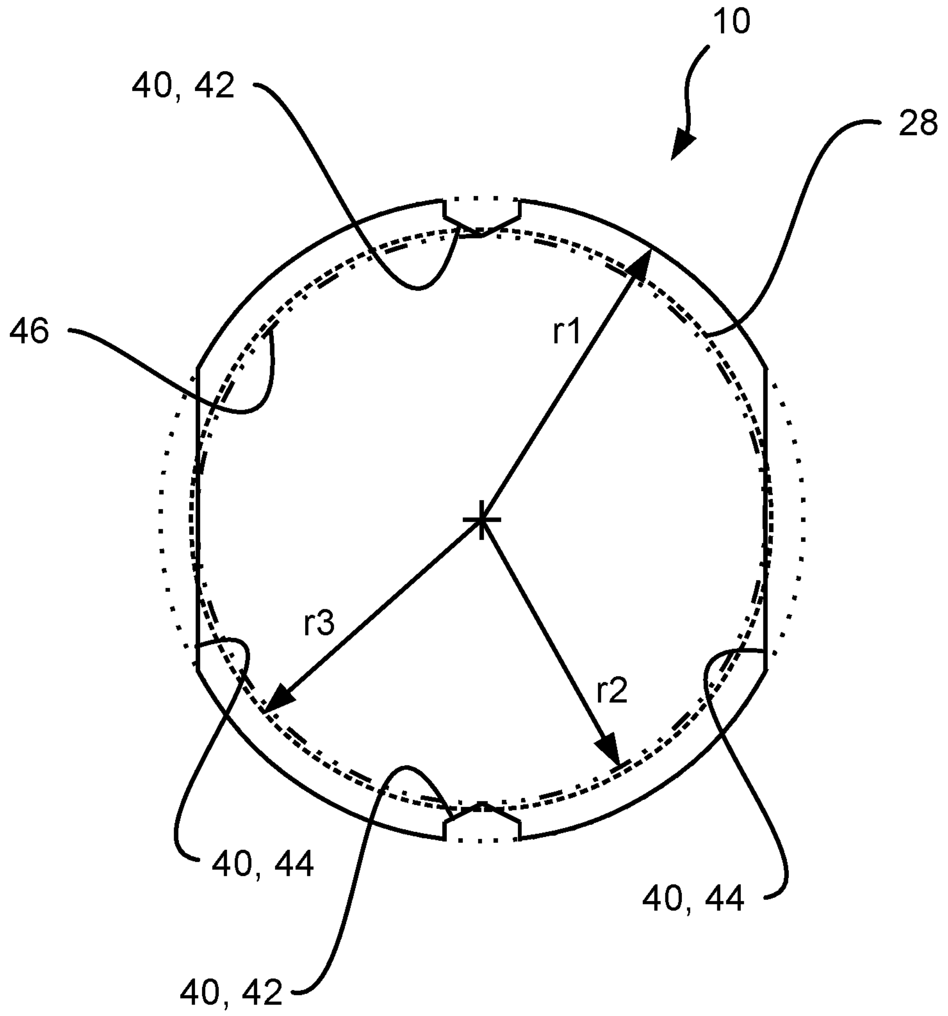
FIG. 5 shows a schematically simplified presentation of a guide shaft from the terminal in FIGS. 1 through 3, FIG. 6, and FIG. 7 show views of a portion of a housing cover of the terminal in FIGS. 1 through 3.

The illustration in FIG. 5 shows a schematically simplified diagram of the basic geometric conditions inside a guide shaft 32 with diameter reducers 40. In FIG. 5, two ribs 42 opposite each other and two flat surfaces 44 opposite each other are shown as a diameter reducer 40. These are regularly distributed along the circumferential line of guide shaft 32. Guide shaft 32 is not round, at least due to flat surfaces 44. Nevertheless, a diameter d1 (normal diameter) of guide shaft 32 is mentioned here and below. This results from the radius r1 of the lateral surface sections, which remain adjacent to the flat areas, with a constant radius (d1=2×r1).

The, or each, rib 42 protrude(s) in the shape of a nose from the inner surface of guide shaft 32; it points radially from the inner surface of guide shaft 32 towards the center of guide shaft 32. The, or each, flat surface 44 is/are in an area in which guide shaft 32 is not limited by a lateral surface section with constant radius r1, but by a flat surface. The surface of a guide shaft 32 with exactly such a flat surface 44 results in the area of this flat surface 44 as the area of a circle with radius r1/diameter d2 (normal radius r1/normal diameter d2) of guide shaft 32 minus the area of a circle segment, where the circle segment results from this circle and a circle chord corresponding to the position of flat surface 44.

An imaginary circle 46 inscribed in a guide shaft 32, transversely to the longitudinal axis of guide shaft 32, the circle line of which touches ribs 42 and flat surfaces 44, has a smaller diameter d2 than guide shaft 32 without these diameter reducers 40 (diameter d1). Ribs 42 and flat surfaces 44 therefore reduce the effective diameter of guide shaft 32. This justifies their designation as diameter reducers 40. This designation includes the two options described here for reducing the effective diameter (rib(s) 42 and/or flat surface (s) 44) and, apart from the specific embodiment shown in the drawings, all these options can be considered in any number and arrangement.

For manufacturing reasons, the, or each, flat surface 44 can be longer in the axial direction of the respective guide shaft 32 than the, or each, rib 42 in the same guide shaft 32. Diameter reducers 40 each work together for axial securing. The area of a guide shaft 32 in which it always has (along its axial extension) all diameter reducing means, i.e. all diameter reducers 40 (so, for example, all ribs 42 and all flat surfaces 44), is referred to as the securing section. In the embodiment, the securing section is a cylindrical portion of each guide shaft 32, which extends from one end of each rib 42 included in guide shaft 32 to the other end thereof in the axial direction of said guide shaft 32. Flat surfaces 44 also extend in this area, therefore in the area of the securing section. However, they may extend (in the axial direction of guide shaft 32) beyond the securing section on one or both sides.

To further explain the axial securing of a pilot screw 28 provided in the terminal 10 proposed here, an additional diameter d3 is considered, in addition to the two diameters d1 and d2 already mentioned. The diameters are: Firstly, the diameter d1 of a guide shaft 32 (each guide shaft 32), then the diameter d2 of a circle 46 inscribed in guide shaft 32 in the area of the diameter reducer 40 as described above (diameter d2 in the securing section), and finally the diameter d3 of an exactly cylindrical screw head of a pilot screw 28. For these and the associated radii r1 (d1=2×r1), r2

(d2=2×r2), r3 (d3=2×r3), the following applies: d2<d1, d2<d3; d1>d2; d1>d3; d2<d3 (r2<r1, r2<r3; r1>r2; r1>d3; r2<r3).

A pilot screw can therefore be freely moved axially in guide shaft 32 outside of the securing section, because diameter d3 of the screw head is at least smaller than the diameter d1 of guide shaft 32 in this area. As soon as the screw head enters the area of the securing section, the smaller diameter d2 comes into effect here. This is smaller than the diameter d3 of the screw head.

In particular, diameter reducers 40 are an integral part of housing cover 14 and are in any case made of the same material as housing cover 14. Housing cover 14 is a plastic part. Correspondingly, guide shaft 32 in housing cover 14 (each guide shaft 32) is made out of plastic. The plastic is elastically deformable within the scope of its material properties. Therefore, diameter reducers 40, and/or the section of guide shaft 32 adjoining each diameter reducer 40, are elastically deformable. Because of this elastic deformation, a screw head located in the securing section in guide shaft 32 is clamped (clamped through force-fitting) by diameter reducers 40, or at least some of diameter reducers 40. The screw, namely the pilot screw 28 in the terminal 10 in question, is thereby axially secured in guide shaft 32.

The location of the securing section along each guide shaft 32 (the securing section extends in the axial direction of guide shaft 32 in each said guide shaft 32) is chosen so that the clamping of the screw head is effective whenever pilot section 30, at the opposite end of the pilot screw 28 from the screw head, is in the area of the respective terminal screw hole 26. Because of the clamping of the screw head, the pilot screw 28 is then secured in the axial direction and the pilot section 30 in terminal screw hole 26 secure said pilot screw 28 in the radial direction. Pilot screw 28 is then positioned in line over terminal screw hole 26 in the manner described above, and is also secured here at least against falling out unintentionally or against unwanted tilting.

The means for the axial securing of pilot screw 28, especially the diameter reducers 40, for one, and the pilot sections 30, for another, are together both effective for guiding each pilot screw. The means for axial fixation not only secures pilot screw 28 in the axial direction, but also secures the end of pilot screw 28 with the head in the radial direction as well (radially to the longitudinal axis of pilot screw 28). In the case of a pilot screw 28 secured in the axial direction through the axial securing means, its pilot section 30 is located in the area of terminal screw hole 26, without the threads of pilot screw 28 necessarily being engaged with the threads of terminal screw hole 26. This causes a radial securing (radially to the longitudinal axis of pilot screw 28) of the other end of pilot screw 28, in particular the end with pilot section 30. By radially securing it in both ways, this optimally ensures a matching alignment of the pilot screw 28 with terminal screw hole 26, and with its inward-facing threads, as mentioned above already.

The embodiment shown with four diameter reducers 40, each opposite one another in pairs, has proven to be particularly advantageous. In particular, it must be taken into account that screw heads, and therefore the heads of the pilot screws chosen for use here, are not always exactly round. This depends above all on the method of manufacture. In the case of screw heads that do not have a sufficiently precise cylindrical shape, if there are fewer than four diameter reducers 40, the screw head may not be sufficiently clamped in the securing section.

In particular, the desired axial securing of the screw, in this case pilot screw 28, would then no longer be possible. With four diameter reducers 40, each located in a quadrant of guide shaft 32, this clamping is ensured, even with screw heads that are not exactly round.

Figure 6:
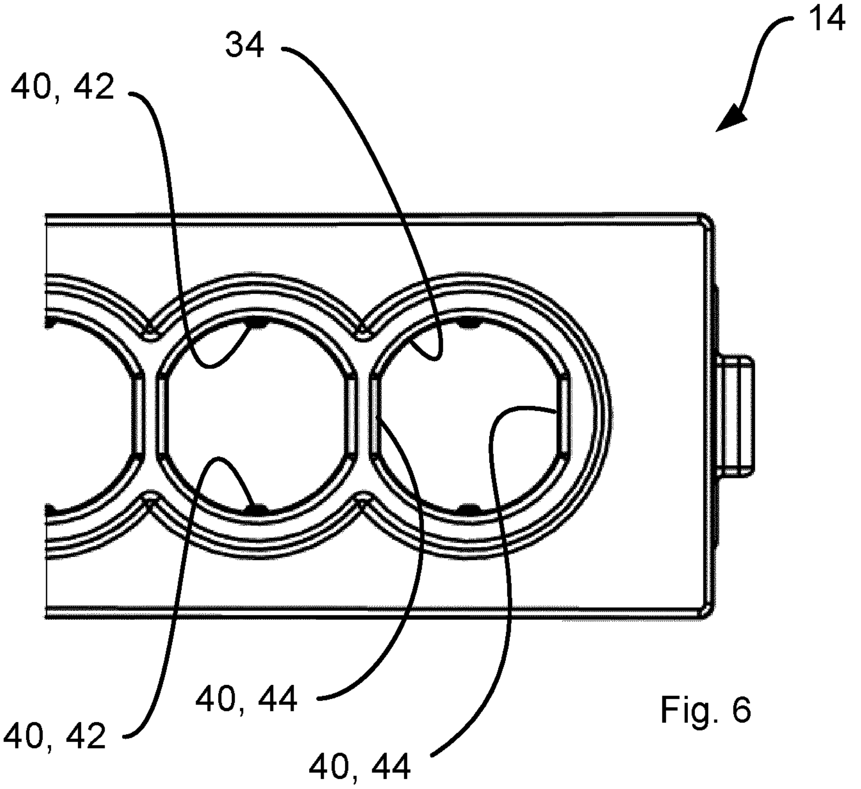
Figure 7:
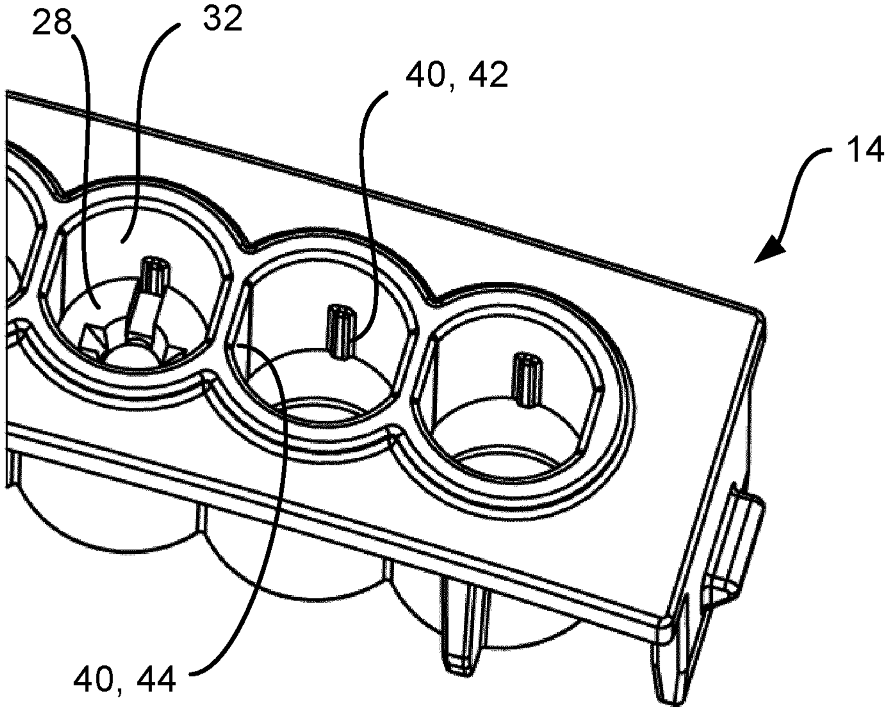

The illustrations in FIGS. 6 and 7 show a portion of housing cover 14. The illustration in FIG. 6 shows a portion of housing cover 14 in a top view. The illustration in FIG. 7 shows an isometric view of the housing cover part. In the illustrations in FIGS. 6 and 7, the diameter reducers 40, especially the ribs 42 and flat surfaces 44, which act as said diameter reducers 40 in the embodiment shown, are particularly easy to see. In the illustration in FIG. 7, there is a pilot screw 28, the head of which can be seen, in one of the guide shafts 32 shown. The head of pilot screw 28 is located in guide shaft 32 at the level of all diameter reducers 40. The screw head will therefore be clamped by means of the diameter reducers 40 (held by means of diameter reducers 40 through force fitting). Pilot screw 28 is axially secured in this position and is also radially secured on its end with the screw head.

Figure 8:
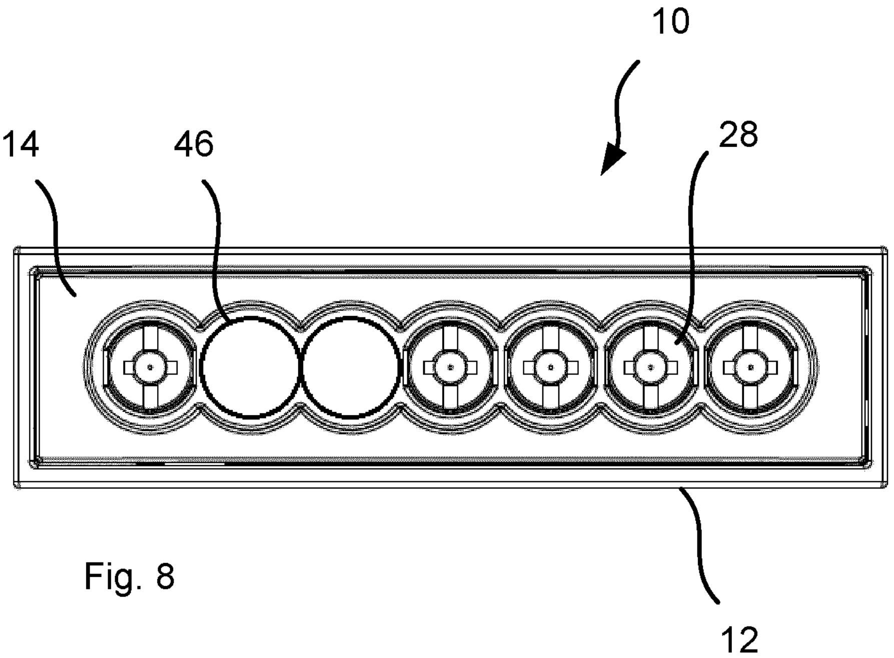
FIG. 8 shows a view of the terminal from above where an imaginary enveloping circles drawn around its insertion openings.

The flat surfaces 44, as diameter reducers 40, in addition to participating in the axial securing of pilot screw 28 and radially securing pilot screw 28 on one side (the head side), have another advantage, which is explained in reference to the illustration in FIG. 8. The illustration in FIG. 8 shows terminal 10 from above as in FIG. 3. Two of the pilot screws 28 are hidden in favor of an illustration of an imaginary enveloping circle 48 (the illustration in FIG. 3 shows all the pilot screws 28, in particular their screw heads, which can be seen in the guide shafts 32). The enveloping circle 28 encloses the insertion opening 34 of each guide shaft 32 (enveloping circle 28 corresponds to the circle with radius r1 in the illustration in FIG. 5).

As can be seen (FIGS. 1, 3 and 8) the guide shafts 32 are arranged along a straight line in housing cover 14. Each two guide shafts 32 are neighboring each other in pairs. Flat surfaces 44, which function as diameter reducers 40, are each located in an area of the smallest distance between two pairs of adjacent guide shafts. This makes possible a very small distance between two pairs of adjacent guide shafts 32, while at the same time maintaining a separation of said guide shafts 32 (the inner surface of each guide shaft 32 is continuous along the entire circumferential line). The distance from one flat surface 44 to the opposite flat surface 44 of the same guide shaft 32 is smaller than the diameter of the enveloping circle 48 surrounding insertion opening 34 of said guide shaft 32. Along the straight line, along which the guide shafts 32 are formed and arranged in housing cover 14, said guide shafts 32 are therefore narrower than enveloping circle 48 (see also FIG. 5: r2<r1). Therefore, even if guide shafts 32 are separated, smaller distances are possible than with completely round guide shafts 32.

A particularly small distance is provided when the guide shafts 32 in housing cover 14 are designed with such distances that the imaginary minimal enveloping circles 48 touch each other or partially overlap around an insertion opening 34 of said guide shafts 32. The illustration in FIG. 7 shows the situation where enveloping circles 48 at least touch one another. Enveloping circles 48 are minimal if they have the smallest possible diameter with which said enveloping circle 48 still enclose insertion opening 34.

In the embodiment of terminal 10 shown, flat surfaces 44 of all guide shafts 32 are parallel to one another. This makes possible a small or minimal distance between all guide shafts 32. This also makes it possible for terminal 10 to be small in size along the straight line along which guide shafts 32 are arranged and formed in housing cover 14. Finally, this also makes possible a correspondingly shorter terminal body 20, and a shorter terminal body 20 leads to a savings in materials.

Although the invention has been illustrated and described in detail by the example embodiment, is not limited by the examples disclosed and other variations may be derived therefrom by persons skilled in the art without departing from the protective scope of the invention.

Individual key aspects of the description submitted here can be briefly summarized as follows: A terminal is specified, which functions in particular as a PEN terminal (for connecting PEN conductors; PEN=protective earth neutral) for connecting electrical conductors. Its special feature lies in the use of pilot screws 28 as terminal screws and/or in the way in which the pilot screws 28 are secured axially and/or radially.

LIST OF REFERENCE SYMBOLS

10 Terminal
12 Housing base body
14 Housing cover
20 Terminal body
22 Conductor insertion hole
24 Conductor insertion opening
26 Terminal screw hole
28 Pilot screw
30 Pilot section
32 Guide shaft
34 Insertion opening
40 Diameter reducer
42 Rib
44 Flat surface
46 Circle
48 Enveloping circle

The invention claimed is:

1. Terminal (10) for connection of electrical conductors, comprising:
a housing base body (12);
a terminal body (20) positioned in said housing base body (12), wherein said terminal body (20) comprises conductor insertion holes (22) and terminal screw holes (26), for terminal screws, transverse to said conductor insertion holes (22);
pilot screws (28) functioning as terminal screws;
a housing cover (14) connectable to said housing base body (12), wherein:
said housing cover (14) comprises guide shafts (32) along a straight line, with two guide shafts (32) adjacent to each other in pairs, and aligned with said conductor insertion holes (22),
each guide shaft (32) comprises diameter reducers (40), and two pairs of ribs (42) and/or flat surfaces (44) opposite of each other along a circumferential line of the guide shaft (32) functioning as diameter reducers (40), and
flat surfaces (44) functioning as diameter reducers 40 are located in an area of the smallest distance between two pairs of adjacent guide shafts (32).

2. Terminal (10) according to claim 1,
wherein flat surfaces (44) are parallel to each other for all guide shafts (32).

3. Terminal (10) according to claim 1,
wherein the guide shafts (32) each ends in an insertion opening (34) on a surface of housing cover (14), and wherein imaginary minimal enveloping circles touch each other or overlap partially around an insertion opening (34).

4. Use of a terminal (10) for connection of electrical conductors, which comprises:
a housing base body (12);
a terminal body (20) positioned in said housing base body (12), wherein said terminal body (20) comprises conductor insertion holes (22) and terminal screw holes (26), for terminal screws, transverse to said conductor insertion holes (22);
pilot screws (28) functioning as terminal screws;
a housing cover (14) connectable to said housing base body (12), wherein:
said housing cover (14) comprises guide shafts (32) aligned with said conductor insertion holes (22),
each guide shaft (32) comprises diameter reducers (40), and two pairs of ribs (42) and/or flat surfaces (44) opposite of each other along a circumferential line of the guide shaft (32) functioning as diameter reducers (40),
wherein firstly a pilot section (30) for each pilot screw (28) and secondly diameter reducers (40) for each guide shaft (32) are effective for radially securing a pilot screw (28) in both ways.

5. Use according to claim 4,
wherein pilot screws (28) are firstly secured axially and secondly secured radially on both ends, without threads from the pilot screw (28) engaging with the threads of terminal screw holes (26).

6. Method for manufacturing a terminal (10) for connection of electrical conductors, which comprises a housing base body (12), a terminal body (12) positioned in said housing base body (12), and a housing cover (14) connectable to said housing base body (12), wherein said terminal body (20) comprises conductor insertion holes (22) and terminal screw holes (26), for terminal screws, transverse to said conductor insertion holes (22); and pilot screws (28) functioning as terminal screws, the method comprising:
positioning a fully assembled terminal body (20) in said housing base body (12), said housing base body (12) then being closed by means of the housing cover (14), and said housing cover (14) securing said terminal body (20) in said housing base body (12),
in the fully assembled terminal body (20), partially screwing threaded shafts of said pilot screws (28) into terminal screw holes (26) of said terminal body (20), and
after said housing base body (12) has been closed with said housing cover (14), locating heads of pilot screws (28) in said guide shafts (32) formed in said housing cover (14).

7. Method for manufacturing a terminal (10) for connection of electrical conductors, which comprises a housing base body (12), a terminal body (12) positioned in said housing base body (12), and a housing cover (14) connectable to said housing base body (12), wherein said terminal body (20) comprises conductor insertion holes (22) and terminal screw holes (26), for terminal screws, transverse to said conductor insertion holes (22); and pilot screws (28) functioning as terminal screws, the method comprising:
positioning said terminal body (20), without the pilot screws (28), in housing base body (12), said housing base body (12) then being closed by means of the housing cover (14), and said housing cover (14) securing said terminal body (20) in said housing base body (12), inserting said pilot screws (28) through the guide shafts (32) formed in said housing cover (14), and at least partially screwing said pilot screws (28) into the terminal screw holes (26) in said terminal body (20).

8. Method according to claim 6, wherein for the testing of operability of the threads of all terminal screw holes (26), the pilot screws (28) are fully screwed into said terminal screw holes (26) once and then unscrewed again, so that there remains only a little bit of contact.

9. Terminal (10) for connection of electrical conductors, comprising:

a housing base body (12), a terminal body (12) positioned in said housing base body (12), and a housing cover (14) connectable to said housing base body (12), wherein said terminal body (20) comprises conductor insertion holes (22) and terminal screw holes (26), for terminal screws, transverse to said conductor insertion holes (22); and pilot screws (28) functioning as terminal screws, wherein said terminal (10) is manufactured according to the method of claim 6.

10. Method according to claim 7, wherein for the testing of operability of the threads of all terminal screw holes (26), the pilot screws (28) are fully screwed into said terminal screw holes (26) once and then unscrewed again, so that there remains only a little bit of contact.

11. Terminal (10) for connection of electrical conductors, comprising:

a housing base body (12), a terminal body (12) positioned in said housing base body (12), and a housing cover (14) connectable to said housing base body (12), wherein said terminal body (20) comprises conductor insertion holes (22) and terminal screw holes (26), for terminal screws, transverse to said conductor insertion holes (22); and pilot screws (28) functioning as terminal screws, wherein said terminal (10) is manufactured according to the method of claim 7.

* * * * *